June 9, 1959 W. W. WATROUS, JR 2,890,319
FAST-HEATING HYDROGEN RESERVOIR
Filed Sept. 16, 1957

INVENTOR.
WARD W. WATROUS, JR.
BY
*Eyre, Mann & Lucas*
ATTORNEYS

United States Patent Office 2,890,319
Patented June 9, 1959

2,890,319

FAST-HEATING HYDROGEN RESERVOIR

Ward W. Watrous, Jr., Chatham, N.J., assignor to Tung-Sol Electric Inc., a corporation of Delaware Application September 16, 1957, Serial No. 684,106

13 Claims. (Cl. 219—38)

This invention relates to a structure for storing and releasing hydrogen. It may be used in many applications but it is especially designed for use within the envelope of a gas discharge device, such as a thyratron, in order to adjust and maintain the hydrogen pressure within the envelope at a desired pressure. The invention has particular reference to a heat transmitting structure for storing the hydrogen reservoir, this structure permitting fast generation of hydrogen gas when a heating current is first turned on, and fast absorption of the gas when the heating current is turned off.

Many devices have been used for storing hydrogen inside a gaseous discharge device. The earlier forms comprised a sleeve filled with a powdered metal hydride, closed at one end and covered with a fine mesh screen at the other. Later devices included a container holding a strip of metal with a coating of a metal hydride on its surface. The strip may be heated directly by the passage of current through it or it may be heated by the radiation from an adjacent electrical resistor.

Prior art devices all have certain limitations. They are slow acting and do not build up the desired pressure within the discharge envelope for several seconds. This is a distinct disadvantage, especially when the discharge device is used in a radar circuit or with any other communication device where speed is important.

The present invention includes a supporting structure having a central heater element, heat radiating fins at its periphery, and a plurality of hydrogen absorbing and generating elements surrounding the heater and in heat-conducting contact with the fins. Such a hydrogen reservoir heats quickly because the fins are in a vacuum and it operates at high heat efficiency when the temperature of the discs is rising, and then, when a steady state exists and the fins are surrounded by gas, operates at low heat efficiency because heat is transferred from the fins to the gas by conduction.

One of the objects of this invention is to provide an improved hydrogen reservoir which avoids one or more of the disadvantages and limitations of prior art arrangements.

Another object of the invention is to provide a structure for a hydrogen reservoir which is fast acting during the initial generating period.

Another object of the invention is to provide a hydrogen storage unit which has a large capacity for storing hydrogen.

The invention comprises a cylindrical metal tube with a plurality of titanium discs mounted adjoining its inside surface. The discs are mounted parallel to each other and each contains a central hole. A heater element, with exterior terminals, is mounted so that it passes through the holes in the discs and heats the discs to an elevated temperature when the pressure of the hydrogen is to be raised. Radiating fins are secured to the outside of the tube to radiate heat.

For a better understanding of the present invention, together with other and further objects thereof, reference is made to the following description taken in connection with the accompanying drawings.

Figure 1:
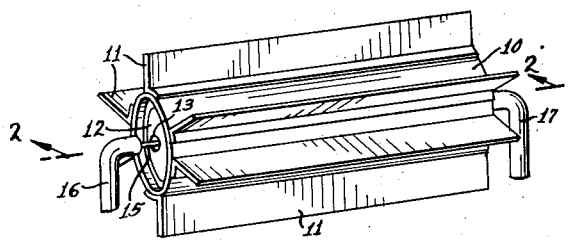
Fig. 1 is an isometric view of the reservoir.
Figure 2:
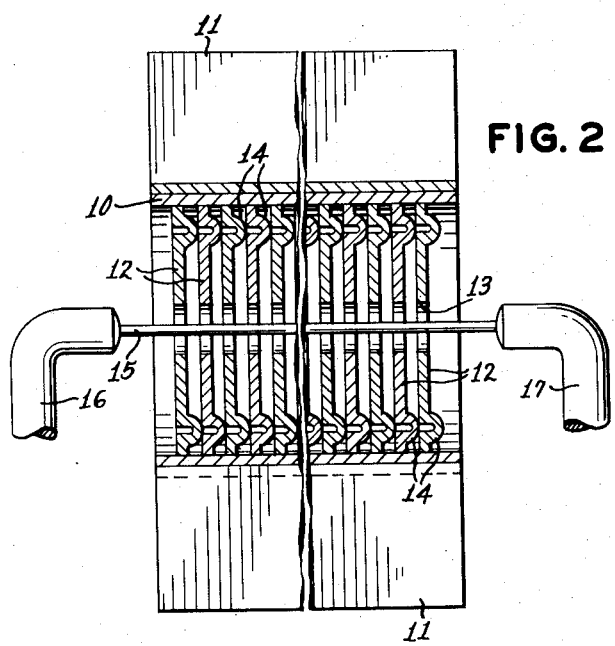
Fig. 2 is a partial cross sectional view of the reservoir showing the internal construction and taken on the line 2—2 of Fig. 1.

Referring now to Figs. 1 and 2, the reservoir comprises a cylindrical tube 10 which may be mounted in any convenient manner within an electrical discharge device or any other container. On the outside surface of tube 10 a plurality of radiation fins 11 are mounted, generally by spot-welding to the tube. On the inside of the tube a plurality of discs 12 are mounted, these discs being made of a substance such as titanium or zirconium which readily combines with hydrogen to form a metal hydride. The discs 12 are formed with a central hole 13 and each disc is formed with a series of dimples 14 or other similar extrusions to provide a spacing means to keep the discs separated from each other. The discs are made to fit snugly within the cylindrical tube 10 so that heat may be readily transferred from the discs to the tube.

A heating element 15, which may be a tungsten wire, is mounted in axial alignment with the tube, extending through the central hole of all the discs. The ends of the heating element are welded or otherwise secured to a pair of conductive rods 16, 17, which hold the element in alignment and provide lead-in conductors for the passage of the heater current.

Discharge devices using such a reservoir are first exhausted of all gas and then, while still connected to the pumping system, maximum current is applied to the heater element 15 to drive off all occluded gas molecules. After a short time interval (about 3 minutes) hydrogen is admitted to the envelope at a pressure which makes available a certain volume of hydrogen in proportion to the weight of the titanium discs. This volume is within the range of 10 to 100 liter-millimeters per gram of titanium. The current through the heater is then reduced slowly, allowing the hydrogen to be absorbed slowly. This method has been found to produce the best hydride coating on the discs. The discharge device is now ready for use.

The heater element 15 is designed so that it furnishes considerably more heat than prior art reservoirs using the same metal hydrides and storing gas for a similar volume within the discharge device envelope. One prior art reservoir using no cooling fins and with isolated hydride elements has been operated with 10 watts power dissipation in the heater. A reservoir with cooling fins constructed as described above requires 15 watts in the heater for proper operation. Because of this additional heat the central portions of discs 12 give off hydrogen at a faster rate and produce the required pressure in a shorter time.

When the flow of heat reaches the tube 10 and the attached cooling fins 11, the heat is transferred to the gas by convection and the assembly is not raised to an excessive temperature. During the operation of the reservoir in a steady state condition a large amount of heat is generated at the element 15, this quickly flows through the discs 12 and is radiated by the fins 11, causing the reservoir to operate at low heat efficiency. However, the additional power required by this reservoir is offset by the improved operating conditions.

When the current is cut off from the heater 15 the temperature of all the discs is lowered at a fast rate because of the radiating properties of the fins 11 and the hydrogen gas is absorbed quickly.

Figure 3:
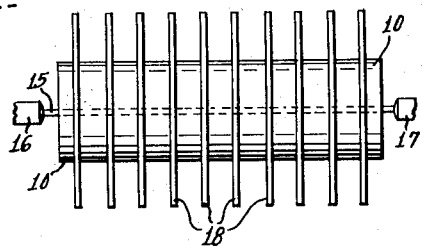
Fig. 3 is a side view of an alternate form of reservoir similar to that shown in Fig. 1 but having cooling fins arranged in different planes.

The reservoir shown in Fig. 3 is fabricated in the same manner as that shown in Figs. 1 and 2, except that the radiating fins 18 are mounted with their surfaces transverse to the axis of the cylindrical tube 10. There is no apparent advantage of either form of fin over the other, the selection of any form depending upon the ease of fabrication.

Figure 4:
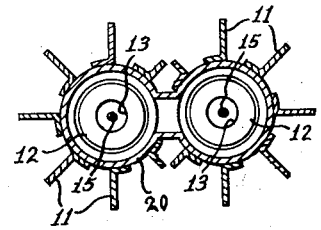
Fig. 4 is a cross sectional view of an alternate form of reservoir showing a double construction.

The twin reservoir shown in Fig. 4 is an alternate arrangement and comprises a multiple tube 20 having a cross section similar to a figure 8. Discs 12 are assembled in each of the tubular cavities as shown and two heater elements 15 are mounted in the aligned holes in the discs. This form operates in the same manner as the one described but obviously has the ability to absorb and generate a larger volume of gas.

It will be obvious that the invention is primarily related to a cooling means and a mounting associated with such means. While titanium metal discs are the preferred storage means, other metals may be used, such as zirconium, columbium, or any metal from the general group which readily forms metal hydrides.

Figure 5:
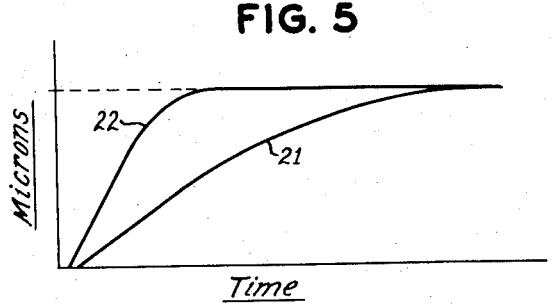
Fig. 5 is a graph showing the relationship of the pressure of hydrogen plotted against time for the fast-heating reservoir and for prior art devices.

The graph shown in Fig. 5 illustrates the relative speed of pressure build-up within an enclosure when a prior art reservoir is employed (curve 21) and when the above described reservoir is employed (curve 22). The present invention produces the desired pressure in about one-third the time required by prior art devices.

Having thus fully described the invention, what is claimed as new and desired to be secured by Letters Patent of the United States is:

1. A hydrogen reservoir comprising: a plurality of metallic discs mounted in parallel array within a heat conductive cylindrical tube; said discs made of an element taken from the group which consists of titanium, zirconium, tantalum, and columbium; each of said discs having an axial hole; a plurality of cooling fins secured to said tube; and an electrical heating element positioned within the holes in said discs.

2. A hydrogen reservoir comprising: a plurality of metallic discs mounted in parallel array within a heat conductive cylindrical tube; the edges of said discs adjoining the inside surface of the tube in heat conductive relationship; said discs made of an element which forms a hydride at room temperature; each of said discs having an axial hole; a plurality of cooling fins secured to said tube; and an electrical heating element positioned within the holes in said discs.

3. A hydrogen reservoir comprising: a plurality of metallic discs mounted in parallel array within a heat conductive cylindrical tube; said discs disposed normal to the axis of the cylinder and made of an element taken from the group which consists of titanium, zirconium, tantalum, and columbium; each of said discs having an axial hole; a plurality of cooling fins secured to said tube; and an electrical heating element positioned within the holes in said discs.

4. A hydrogen reservoir comprising: a plurality of metallic discs mounted in parallel array within a heat conductive cylindrical tube; said discs made of an element taken from the group which consists of titanium, zirconium, tantalum, and columbium; each of said discs having a central hole, a plurality of metallic heat conductive cooling fins secured to the outside surface of said tube in heat conductive relationship; and an electrical heating element mounted so as to pass through the holes in said discs.

5. A hydrogen reservoir comprising: a plurality of titanium discs mounted in parallel array within a heat conductive cylindrical tube; said discs each containing a central hole, a plurality of cooling fins secured to said tube, and an electrical heating element mounted so as to pass through the holes in said discs.

6. A hydrogen reservoir comprising: a plurality of columbium discs mounted in parallel array within a heat conductive cylindrical tube; said discs each containing a central hole, a plurality of cooling fins secured to said tube, and an electrical heating element mounted so as to pass through the holes in said discs.

7. A hydrogen reservoir comprising: a plurality of titanium discs mounted in parallel array within a heat conductive cylindrical tube, said discs each containing spacing means for separating each discs from the adjacent disc, each of said discs having a central hole, a plurality of heat conductive cooling fins secured to the outside surface of the cylindrical tube, and an electrical heating element mounted so as to pass through the holes in said discs.

8. A hydrogen reservoir comprising: a plurality of titanium discs mounted in parallel array within a heat conductive cylindrical tube, said discs each containing spacing means for separating each disc from the adjacent disc, each of said discs having a central hole, a plurality of heat conductive fins secured to the outside surface of the cylindrical tube, an electrical heating element extending through the holes in said discs, and mounting means external of the tube for securing said heating element in axial position.

9. A hydrogen reservoir as set forth in claim 8 wherein said mounting means include conductive supports which may be connected to a source of electrical power when the reservoir is generating hydrogen.

10. A hydrogen reservoir as set forth in claim 8 wherein said spacing means includes extruded portions of the disc extending above the disc surface for contact with the adjoining disc.

11. A hydrogen reservoir comprising: a plurality of zirconium discs mounted in parallel array within a heat conductive cylindrical tube; said discs each containing a central hole; a plurality of cooling fins secured to said tube; and an electrical heating element mounted so as to pass through the holes in said discs.

12. A hydrogen reservoir comprising: a plurality of tantalum discs mounted in parallel array within a heat conductive cylindrical tube, said discs each containing a central hole, a plurality of cooling fins secured to said tube, and an electrical heating element mounted so as to pass through the holes in said discs.

13. A fast acting hydrogen reservoir for an evacuated discharge device comprising: A plurality of titanium discs mounted in parallel array within a heat conductive cylindrical tube, said discs each including spacing means for separating each disc from the adjacent disc, each of said discs having a central hole, a plurality of heat conductive cooling fins secured to the outside surface of the cylindrical tube, and an electrical heating element mounted so as to pass through the holes in said discs, said cooling fins arranged to radiate a minimum of heat energy during a starting period and to radiate a maximum of heat energy after the hydrogen pressure within said discharge device has reached a predetermined pressure.

References Cited in the file of this patent

UNITED STATES PATENTS

| | | |
|---|---|---|
| 1,880,238 | Colligan | Oct. 4, 1932 |
| 2,253,145 | Smith | Aug. 19, 1941 |
| 2,528,547 | Reilly et al. | Nov. 7, 1950 |
| 2,640,952 | Swanson | June 2, 1953 |
| 2,676,238 | Coates | Apr. 20, 1954 |